(No Model.) 4 Sheets—Sheet 2.

T. MANLEY.
SAWDUST FEEDER FOR FURNACES.

No. 547,083. Patented Oct. 1, 1895.

Witnesses:
John Grist
H. H. Dorsey.

Inventor:
Thomas Manley
By Henry Grist
Attorney (No Model.) 4 Sheets—Sheet 3.
T. MANLEY.
SAWDUST FEEDER FOR FURNACES.
No. 547,083. Patented Oct. 1, 1895.

Witnesses:
John Grist
H. H. Horsey.

Inventor:
Thomas Manley
By Henry Grist
Attorney.

(No Model.) 4 Sheets—Sheet 4.
T. MANLEY.
SAWDUST FEEDER FOR FURNACES.

No. 547,083. Patented Oct. 1, 1895.

UNITED STATES PATENT OFFICE.

THOMAS MANLEY, OF PRINCE ALBERT, CANADA.

SAWDUST-FEEDER FOR FURNACES.

SPECIFICATION forming part of Letters Patent No. 547,083, dated October 1, 1895.

Application filed January 31, 1895. Serial No. 536,768. (No model.)

*To all whom it may concern:*

Be it known that I, THOMAS MANLEY, of Prince Albert, in the district of Saskatchewan, in the Northwest Territory of the Dominion of Canada, have invented certain new and useful Improvements in Machines for Operating the Valves of Feed-Spouts of Conveyers of Sawdust to Furnaces; and I do hereby declare that the following is a full, clear, and exact description of the same, reference being had to the accompanying drawings, in which—

Figure 1:
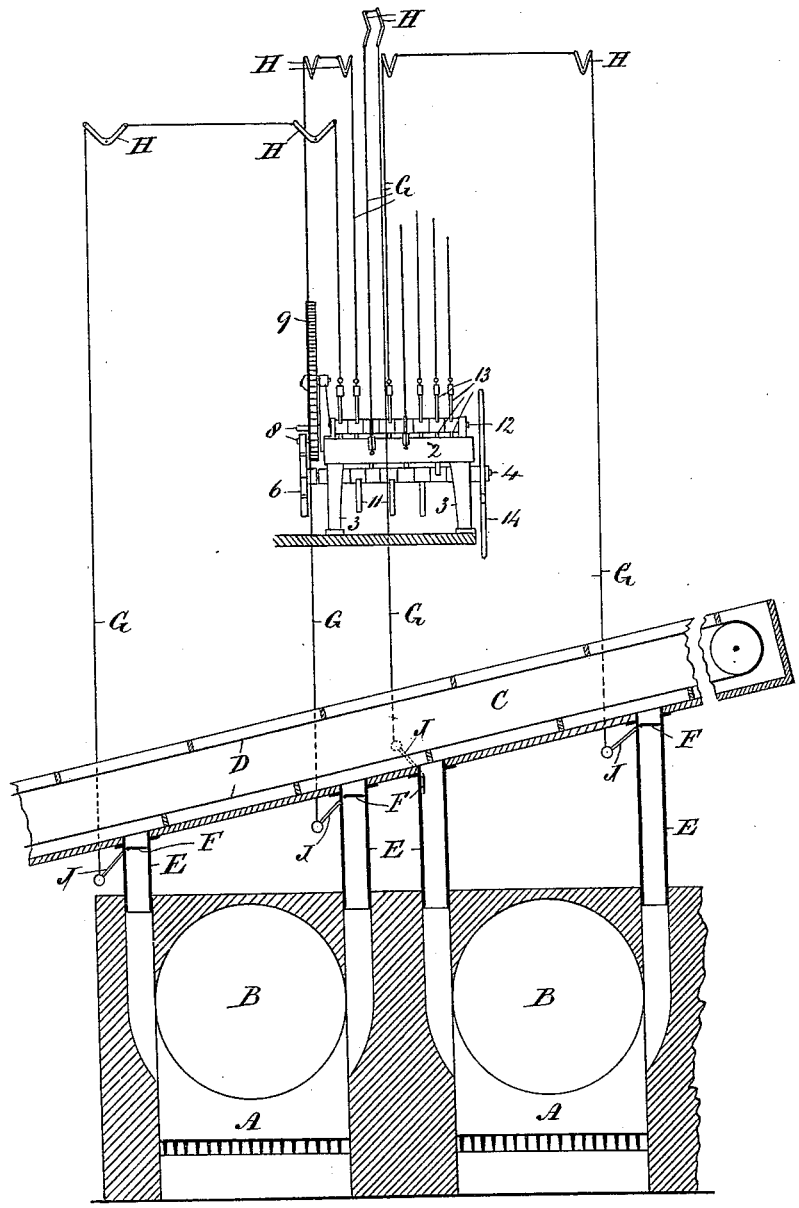
Figure 2:
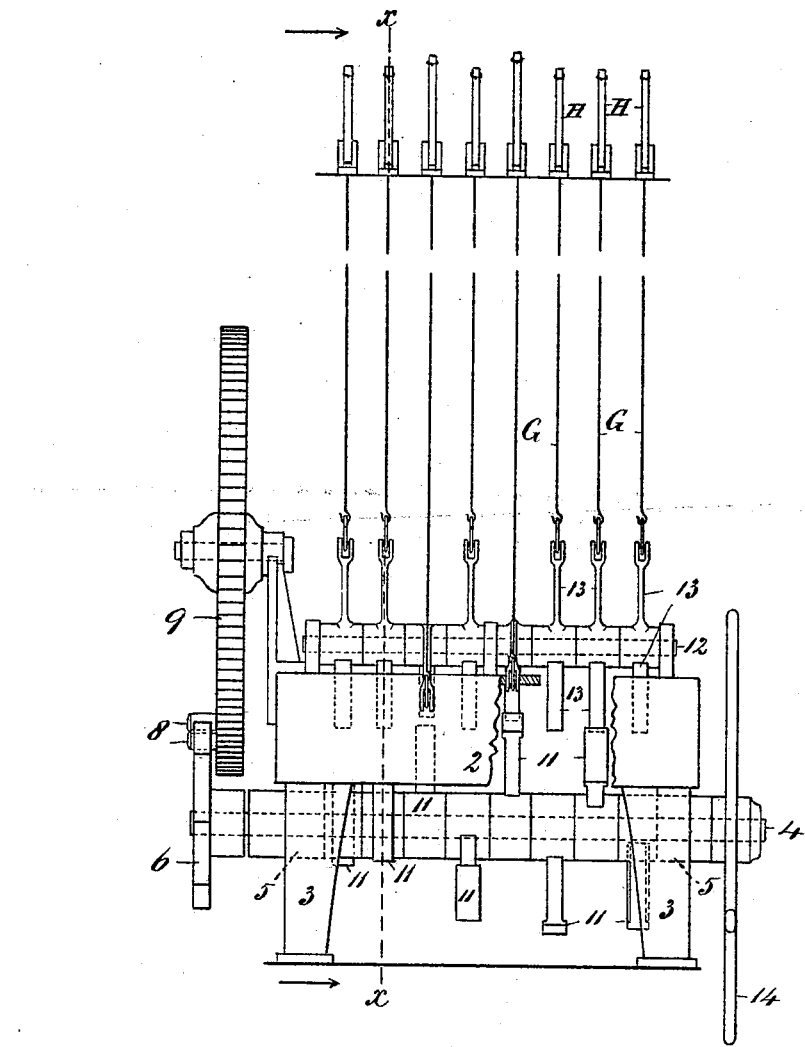
Figure 3:
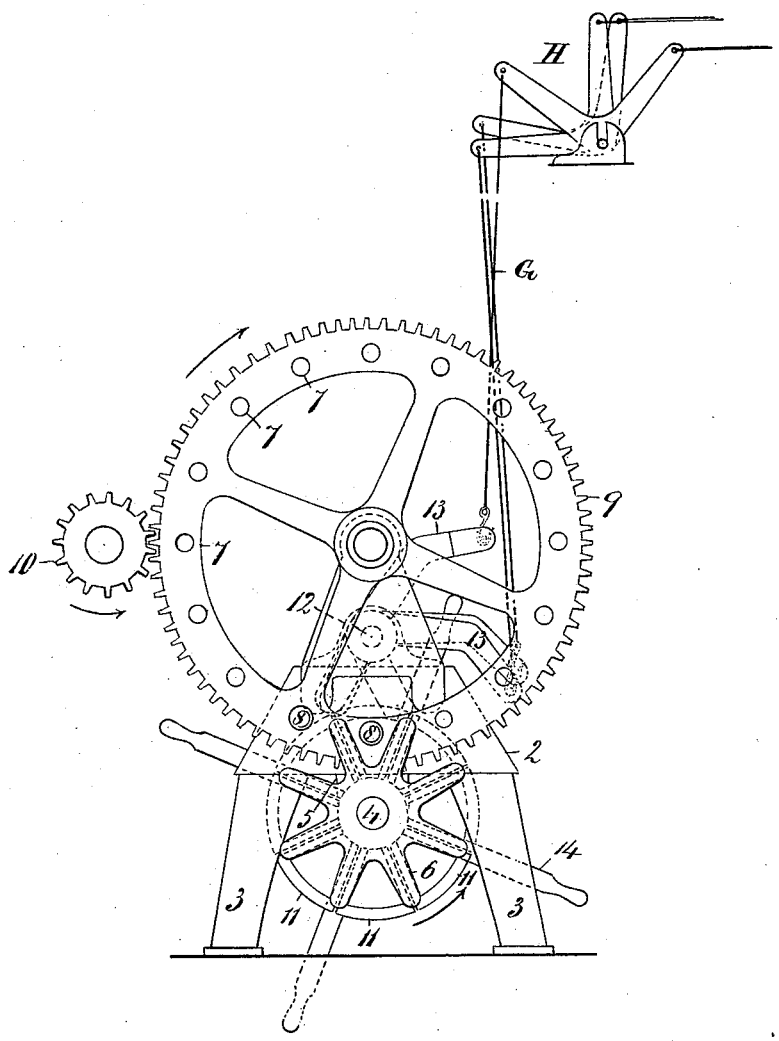
Figure 4:
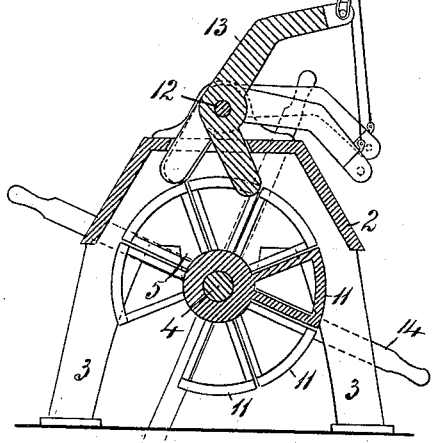
Figure 5:
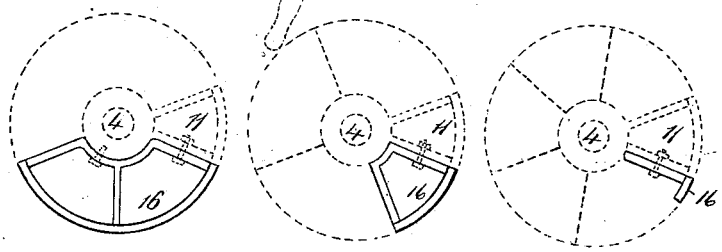

Figure 1 is a sectional elevation of the conveyer, feed-spouts, boilers, and furnaces and a front view of my machine for operating the feed-valves, four spouts shown feeding two furnaces and two boilers and furnaces omitted. Fig. 2 is a front elevation of the machine enlarged, a portion of the front broken away to show the levers. Fig. 3 is an elevation of one end of the machine. Fig. 4 is a section on line $x$ $x$, Fig. 2; and Fig. 5 represents diagrams of three cam-sections for respectively lengthening the cam-surface of the other cams when less than four furnaces are to be fed.

My invention has for its object to automatically open and close in systematic order the valves in feed-spouts of conveyers of sawdust to furnaces, said conveyers substantially of that class in which the sawdust is moved by an endless apron having transverse slats moving against the floor of the conveyer, spouts from the conveyer discharging into the furnaces, and valves in the spouts to deliver and cut off the feed sawdust at intervals.

My invention consists in the construction, arrangement, and combination of parts composing the machine, as hereinafter set forth and claimed.

A A represent furnaces, and B B boilers.

C is the conveyer; D, the endless feed-apron traveling therein; E, feed-spouts connecting the conveyer and furnace, and F valves for the discharge of sawdust for fuel, which valves are opened and closed automatically by the operation of my machine by connection with pull ropes or cables G, bell-cranks H, and a crank-shaft J, connected to each valve. This mode of feeding sawdust to furnaces I do not claim as my invention, for heretofore the pull ropes or cables have been operated by manual power.

The machine constituting my invention is to operate the valves systematically by mechanical means and may be described as follows:

2 is the main frame of the machine, of which 3 are the legs, and said frame is open at top.

4 is the main shaft journaled in hangers or bearings 5 at both ends of the frame, and said shaft has at one end a sprocket-wheel 6, which is engaged by pins or pegs 8, inserted in holes 7 in the rim of a cog-driving wheel 9, which is driven by a pinion 10 from any suitable motive power, and said shaft 4 carries a series of cams 11, preferably arranged to operate or lift alternately by one cam projecting radially in an opposite direction from the next cam or the one preceding, and the friction-surfaces of the cams as a whole form approximately a circle. 12 is a rod or axle supported in standards near the ends of the main frame and is vertical and parallel to shaft 4.

13 represents a series of elbow-levers having a hole at the angle to sleeve on axle 12. To the longer arm of the levers the pull ropes or cables G are connected, and the cams 11 severally engage the opposite or free end of said levers to tilt a lever, whereby the rope or cable will be pulled to open a valve in the feed-spout to feed sawdust to the furnace. After a cam has left a lever the pull of the cable, by the valve closing by gravitation, will react the operated lever to the normal position, to be again acted upon by the respective cam.

14 is a hand-wheel or crossed levers keyed on shaft 4 to operate the machine by hand when it is desired from any cause to suddenly speed the feed. The machine shown is adapted to feed one, two, three, or four furnaces, each furnace receiving at intervals a feed from a feed-spout at opposite sides of the furnace, for the reason, preferably, as hereinafter set forth. When one furnace is to be cut off or three furnaces to be operated, an eight-throw sprocket-wheel 6 is replaced by a six-throw and one peg or pin 8 inserted in one of the holes 7 in the rim of wheel 9 and the two pull-ropes G disconnected from the respective levers 13, which feed the furnace not required to be fed. The disconnected end of the levers will then drop by gravitation, so that the opposite end will be out of contact with the cams, and said two levers will then be inoperative. The contact-surfaces of the eight cams, viewed as a whole, approximately make a complete circle, and to prevent the feed of three furnaces being spasmodical when one is cut off the six operating-cams have their friction-surface lengthened to make approximately a complete circle by bolting to each cam a section 16, such as shown in Fig. 5, and the eight-throw sprocket-wheel is replaced by a six-throw to prevent interruption in time by one furnace not feeding. When two furnaces are cut off, only four cams are required for operation, and these have their cam-surfaces lengthened by bolting to each a section 16 (shown in Fig. 5) of the required length of surface to keep the valve open until the alternate valve is being opened by the operation of the cam and lever corresponding thereto. The six-throw sprocket-wheel is then replaced by the eight-throw wheel and two pins or pegs 8 placed in consecutive holes in the rim of the cog-wheel 9, whereby the sprocket-wheel will be moved two steps at one rotation of the cog-wheel; but, if desired, a four-throw sprocket-wheel may be devised and then only one peg or pin will be required. When three furnaces are cut off by disconnection of six levers, only two cams and levers are required for operating one furnace, and these cams have their surfaces frictionally lengthened by bolting to each of the two cams the larger section 16 (shown in Fig. 5) to make the friction-surfaces form approximately a circle. The eight-throw sprocket-wheel is used and four pegs or pins 8 placed in consecutive holes in the rim of the cog-wheel 9, whereby the sprocket-wheel will be given a half-rotation at one movement or at each rotation of the cog-wheel 9. To make the machine work faster to quicken the feed an additional number of pegs or pins are placed in the holes of the cog-wheel 9. If desired, the cams may be arranged to operate consecutive levers; but my reason for the alternate arrangement is that one feed of fuel shall be given to one side of each surface consecutively and not two feeds, one on each side, as would be the case were the levers operated consecutively by the cams. Feeding the furnaces consecutively with one charge of fuel alternately with the other charge permits the prior feed to be carbonized before the introduction of the next feed or charge and thereby prevents two charges of sawdust smothering the fire.

I claim as my invention—

1. The combination with one or more boiler-furnaces having vertical feed-ducts, a sawdust conveyer, and feed-spouts connecting said ducts and conveyer, said spouts provided with a feed-valve, of elbow levers loose on an axle or rod, a cam-shaft parallel to said axle and having cams engaging said levers, pull cables connecting a valve and elbow lever, driving gear and a cog wheel having pin holes in the rim laterally provided with pins adjustable to suit the number of furnaces in use, and a sprocket wheel operated by the pins and rotating said shaft, the cams arranged thereon and constructed to open the valves in any desired succession by the pull of the cables, to feed saw-dust to the furnaces, and close by gravitation, substantially as set forth.

2. The combination with one or more boiler-furnaces having vertical feed-ducts, a sawdust conveyer and feed-spouts connecting said ducts and conveyer, each spout provided with a feed-valve, of a frame carrying an axle or rod and a cam shaft parallel to one another, a series of elbow levers loose on said axle, cams fast on said shaft and each lifting an elbow lever, a cog wheel having adjustable pins laterally in the rim and driven by the motive power, a sprocket wheel engaged by said pins and rotating said cam shaft, said shaft provided with a hand wheel or levers to speed the cams independently of the motive power when out of gear, and pull cables connecting a valve and elbow lever, as set forth.

3. A machine for pulling cables to open the valves of feed spouts of conveyers of saw dust to furnaces, comprising a main or supporting frame 2, having legs 3, and ends carrying a rod or axle 12 and a shaft 4, parallel to said axle, a series of elbow levers 13, sleeved loosely on said axle, and cams 11, fixed on said shaft and engaging the free end of the levers to rock the same, a driving cog wheel 9, having pins 8, adjustable in holes 7, laterally in the rim, and a sprocket wheel 6, engaged by said pins to rotate said shaft, the cams being arranged thereon to lift the elbow levers in any desired order, all arranged and combined substantially as set forth.

THOMAS MANLEY.

Witnesses:
JOHN GRIST,
H. H. HORSEY.